Oct. 28, 1952 G. G. GOURIET ET AL 2,615,943

APPARATUS FOR COMPARING FREQUENCIES OF ELECTRIC OSCILLATIONS

Filed Jan. 23, 1947 4 Sheets-Sheet 1

INVENTORS
GEOFFREY GEORGE GOURIET
REGINALD HARRY HAMMANS
BY Otto Munk
THEIR ATTY Oct. 28, 1952 G. G. GOURIET ET AL 2,615,943

APPARATUS FOR COMPARING FREQUENCIES OF ELECTRIC OSCILLATIONS

Filed Jan. 23, 1947 4 Sheets-Sheet 2

INVENTORS
GEOFFREY GEORGE GOURIET
REGINALD HARRY HAMMANS
BY Otto Munk
THEIR ATT'Y INVENTORS
GEOFFREY GEORGE GOURIET
REGINALD HARRY HAMMANS
BY Otto Munk
THEIR ATTY Oct. 28, 1952 G. G. GOURIET ET AL 2,615,943

APPARATUS FOR COMPARING FREQUENCIES OF ELECTRIC OSCILLATIONS

Filed Jan. 23, 1947 4 Sheets-Sheet 4

INVENTORS
GEOFFREY GEORGE GOURIET
REGINALD HARRY HAMMANS
BY Otto Munk
THEIR ATTY Patented Oct. 28, 1952 2,615,943

UNITED STATES PATENT OFFICE 2,615,943

APPARATUS FOR COMPARING FREQUENCIES OF ELECTRIC OSCILLATIONS

Geoffrey George Gouriet, Surbiton, and Reginald Harry Hammans, Petts Wood, England Application January 23, 1947, Serial No. 723,788
In Great Britain August 1, 1945

Section 1, Public Law 690, August 8, 1946
Patent expires August 1, 1965

2 Claims. (Cl. 172—245)

Figure 1:
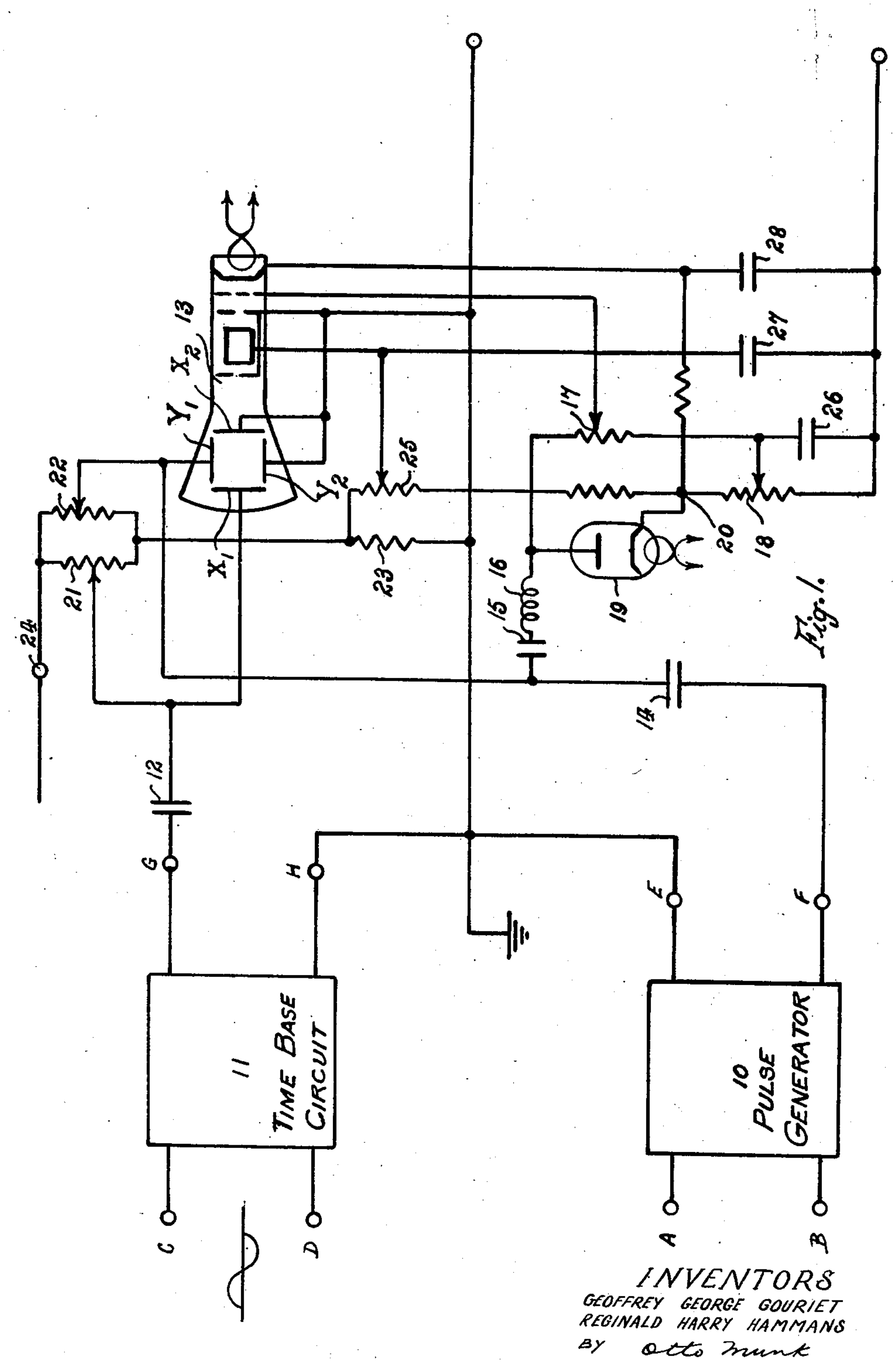

The present invention relates to apparatus for comparing frequencies of electric oscillations.

When two or more radio transmitters physically remote from each other are to be operated on a common frequency it is often necessary to provide some means of ensuring that their driving oscillators are adjusted in such a manner that their carrier frequencies are maintained very nearly or exactly the same. In the special case of high quality broadcast transmitters carrying the same programme, operating on medium or long wavelength and having overlapping service areas, a typical requirement is that the frequency difference between the carriers should not exceed 0.2 c./s. This would give one beat in 5 seconds at a receiver. It is desirable that the frequency agreement should be much better than this if possible.

A known method of frequency-comparison is to appoint one particular driving oscillator as the master oscillator, to derive from that oscillator by frequency division an audio frequency tone to be sent to line and then at a remote "slave" site to use that tone, direct or multiplied, as the reference with which the frequency of the slave oscillator is compared.

The present invention has for its principal object to provide improved apparatus suitable for use at such a slave site for comparing the frequency of the slave oscillator with that of a received tone but is also applicable to comparing frequencies of other origins.

It is a further object of this invention to provide relatively simple means for comparing the frequencies of a number of oscillations of different frequencies using a common reference tone having a frequency which is a sub-multiple of the oscillation frequencies.

According to the present invention, apparatus for comparing the frequencies of a first and a second oscillation, these frequencies being nearly equal to one another or one being nearly an integral multiple of the other, comprises a cathode ray tube, means for generating from the first oscillation, and applying to the cathode ray tube to effect deflection of the ray in a time-base co-ordinate, a saw-tooth oscillation of a frequency equal to that of the first oscillation or to an integral sub-multiple thereof, the saw-tooth oscillation having a stepped wave form and the steps having a frequency which is an integral multiple of the frequency of the saw-tooth oscillation, and means for generating from the second oscillation, and applying to the cathode ray tube to control the deflection of the ray in a second co-ordinate, pulses having a recurrence frequency which is equal to or an integral multiple of the frequency of the second oscillation.

The first and second oscillations which are to be compared as set forth in the preceding paragraph may either or both be derivatives of other oscillations whose frequencies are integral multiples or submultiples of the frequencies of the said first and second oscillations.

In this specification a statement that a first frequency is an integral multiple or submultiple of a second frequency means that the first frequency is equal to the second frequency multiplied or divided, respectively, by an integer.

The statement that one of the frequencies is nearly equal to or nearly an integral multiple of the other means that the frequencies are sufficiently nearly equal or sufficiently nearly in integral multiple relationship for the apparent movement of the image produced on the cathode ray tube screen by the deflection in the said second co-ordinate to be detectable.

Moreover for the purposes of this specification a large vulgar fraction is one in which the denominator is not more than 5, for example ⅓ or ½.

Where the object of the comparison, as will usually be the case, is to adjust one of the frequencies in order to make it as nearly as possible equal to the other frequency or to a multiple or submultiple thereof, the said recurrence frequency is made exactly equal to an integral submultiple or multiple of the frequency of the saw-tooth oscillation, when the said two oscillation frequencies, or multiples or submultiples thereof, are adjusted to be equal.

The steps in the saw-tooth waveform are preferably such that the voltage (or where electromagnetic deflecting means are used, the current) remains substantially constant at uniformly spaced intervals.

Means are preferably provided whereby the frequency of the saw-tooth oscillation can be given any one of a small plurality of different values, all of which satisfy the relationship above set forth, the frequency of the steps being maintained constant. In this way a coarse adjustment is available for use when the frequencies are relatively far removed from one another and a fine adjustment to give the desired accuracy of frequency comparison, for use when the frequencies are nearly equal. One or more intermediate adjustments may be provided if desired.

The apparatus of this invention avoids the need for frequency multiplication of the reference tone and hence the phase stability is improved in comparison with apparatus using the heterodyne method of obtaining "beats" which involves multiplying the tone frequency.

Figure 2:
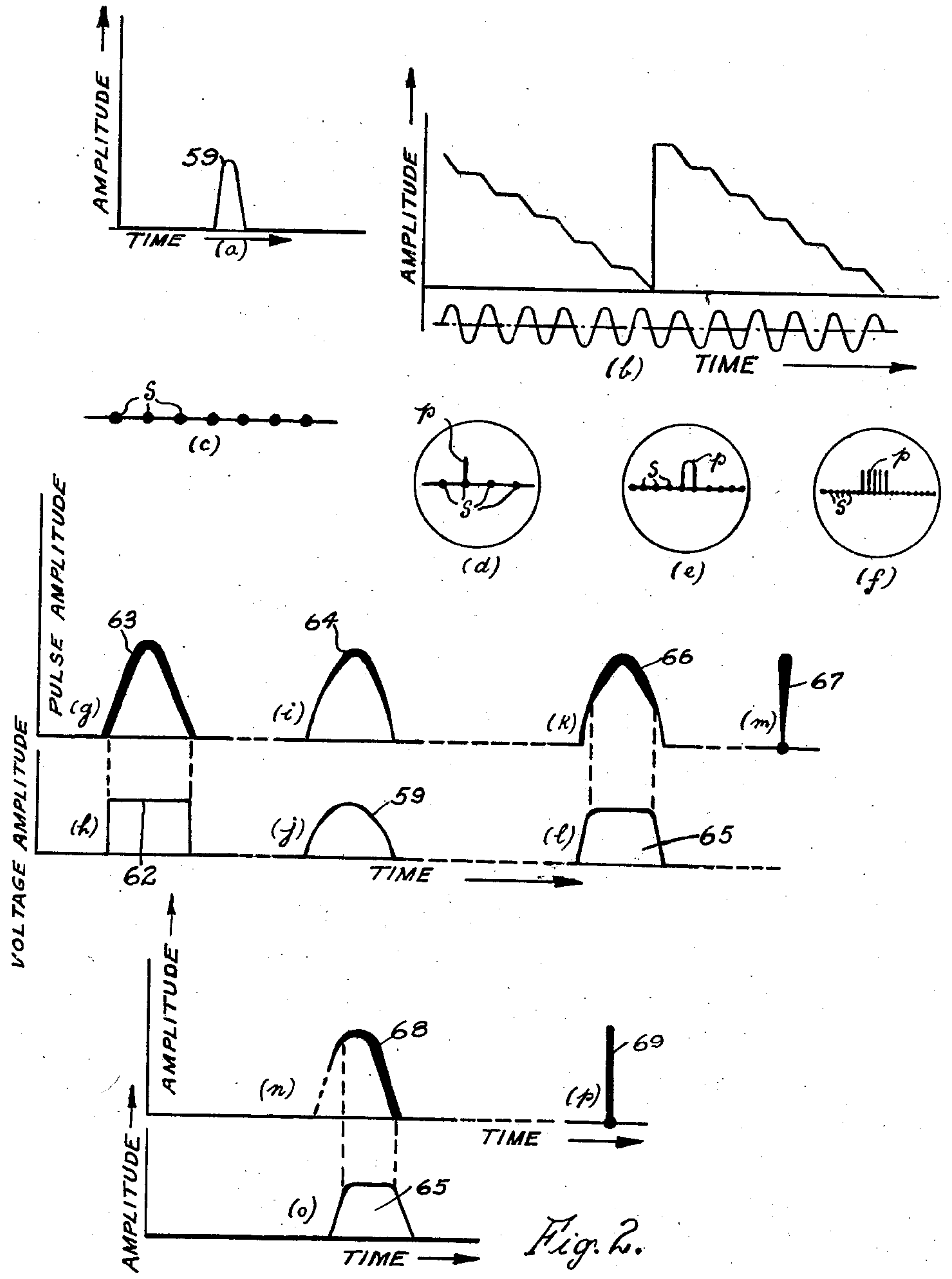
Figure 3:
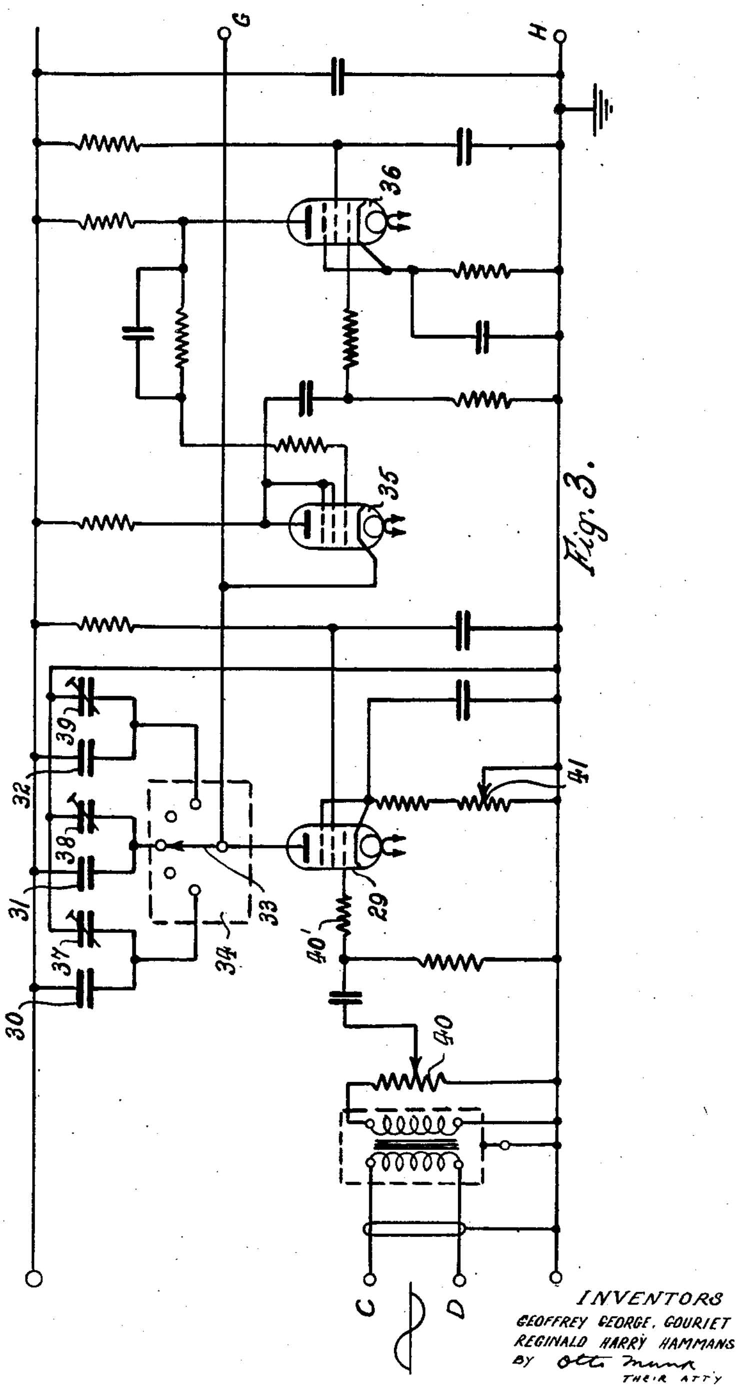

One embodiment of the invention, suitable for use in comparing the frequency of a slave oscillator with that of a master oscillation with the aid of a tone transmitted to the slave site from the master site, will now be described by way of example with reference to the accompanying drawings, in which Fig. 1 is a theoretical circuit diagram of the embodiment, Fig. 2 shows certain wave forms and cathode ray tube displays obtained in the operation of the embodiment of Fig. 1, Fig. 3 is a theoretical circuit diagram of the locked time base shown as a block 11 in Fig. 1.

Figure 4:
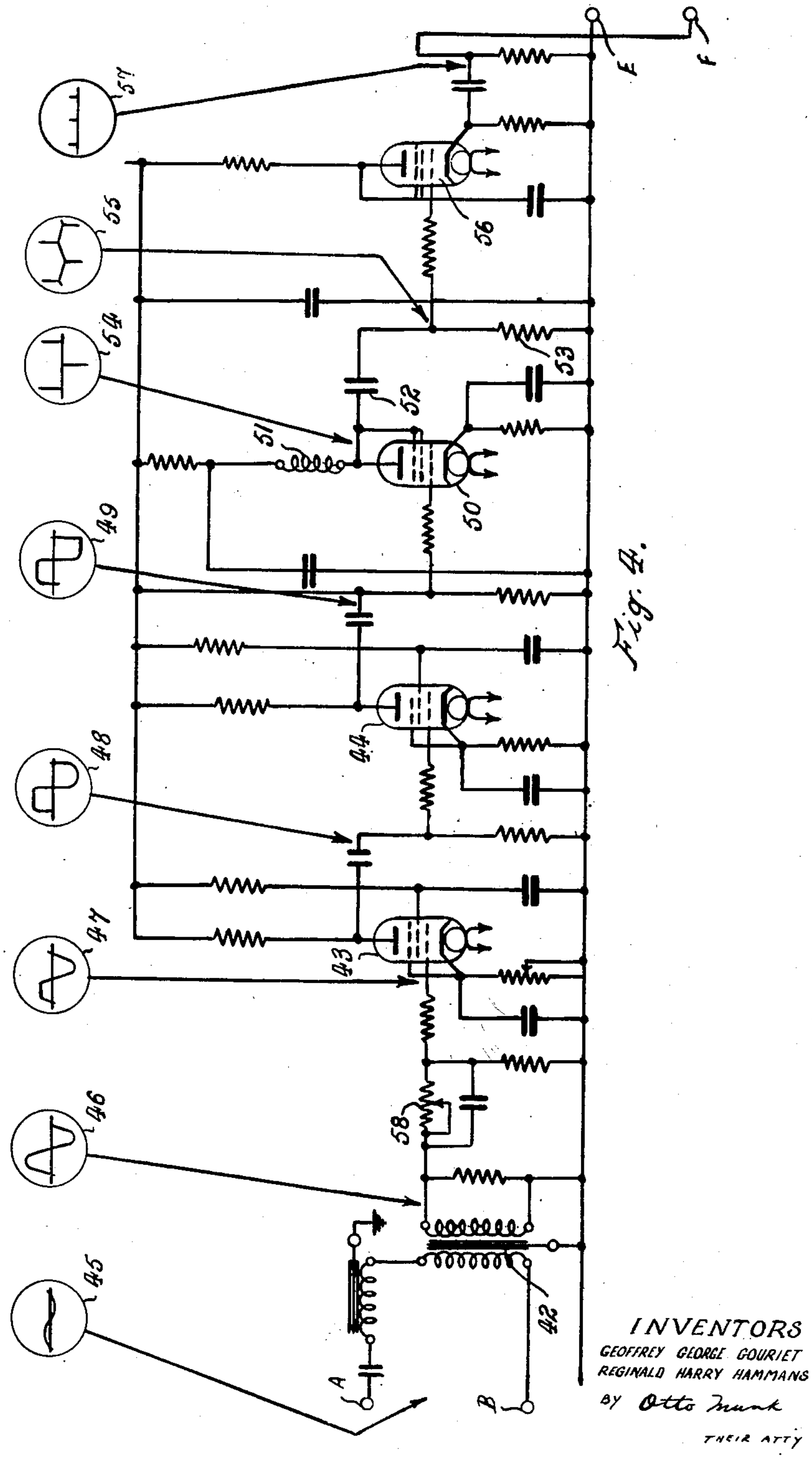

Fig. 4 is a theoretical circuit diagram of the pulse generator shown as a block 10 in Fig. 1.

Referring to Fig. 1, an incoming reference tone derived by frequency division from a master oscillator and transmitted over a telephone line is applied to the terminals A and B of a pulse generator 10. A radio frequency oscillation from a slave oscillator the frequency of which is to be compared with that of the reference tone, is applied to the terminals C and D of a locked time base circuit 11. It is assumed for convenience that the frequency of the reference tone is 1000 c./s. and that of the radio frequency oscillation 1000 kc./s.

It will be noted that these frequencies are in integral multiple relationship, or in other words one is an integral multiple of the other.

The output from the generator 10 appears at the terminals E and F thereof, and consists of a train of positive pulses each pulse having the general shape shown by a curve 59 in Fig. 2 (*a*). The circuit of the pulse generator 10 is such that one positive pulse appears at the terminals E and F for each complete cycle of the reference tone applied to the terminals A and B. Moreover the width of each pulse at its base is comparable with the duration of one half cycle of the radio frequency oscillation applied to the terminals C and D of the locked time base circuit 11.

The time base circuit 11 is arranged to produce at the terminals G and H thereof an oscillation of stepped saw-tooth wave form of the shape shown by a curve 60 in Fig. 2 (*b*). The frequency of this oscillation is arranged to be adjustable to a number of fractions, such for example as one quarter, one tenth, or one twentieth, of the frequency of the oscillations applied to the terminals C and D. The reason for this will be explained later Each horizontal step in this wave form corresponds to a negative half-cycle of the applied radio-frequency oscillation illustrated by a sine wave 61 in Fig. 2 (*b*).

The terminal H of the locked time base circuit 11 is connected to earth, and the terminal G is connected through a condenser 12 to one X plate, $X_1$, of a cathode ray tube 13, the other X plate, $X_2$, being connected to earth. Thus the oscillation of stepped saw-tooth wave form is applied to the cathode ray tube 13 in order to produce horizontal deflection of the cathode beam therein. The resulting horizontal trace produced on the screen of the cathode ray tube 13 is as shown in Fig. 2 (*c*), in which the spots *s* correspond to the horizontal portions of the saw-tooth wave form and the distance between adjacent spots represents one cycle of the applied radio frequency oscillation. The spots *s* are local increases in brightness produced when the ray comes momentarily to rest in the presence of a step in the saw-tooth wave.

Figs. 2 (*d*), (*e*) and (*f*), show the time bases derived by division ratios of 4, 10 and 20 respectively, producing 4 calibration spots *s* in the first case, 10 in the second case and 20 in the third case.

The terminal E of the pulse generator 10 in Fig. 1 is connected to earth and the terminal F is connected through the condenser 14 to one Y plate, $Y_1$, of the cathode ray tube 13, the other Y plate, $Y_2$, being connected to earth. Thus the pulses appearing at the terminals E and F of the generator 10 are applied to the cathode ray tube 13, in order to produce vertical deflection of the cathode ray.

If the time base is operating at a frequency which is equal to an exact multiple of the pulse recurrence frequency, the resulting image on the screen of the cathode ray tube 13 has the form shown in Fig. 2 (*d*), in which the succeeding images *p* of the pulses coincide and a stationary vertical image is produced.

If the frequency of the radio frequency oscillation is increased and assuming that the fly-back of the trace is from right to left the vertical image *p* of the pulses moves from left to right across the screen of the cathode ray tube 13 (Fig. 1) at a rate which increases with increase in frequency. Similarly, if the frequency of the radio frequency oscillation is reduced, the vertical image *p* moves from right to left, at a rate which increases with decrease in frequency.

Assuming that the frequency of the time base is set at one tenth of that of the applied radio frequency oscillation, the time taken for the cathode ray to traverse the horizontal sweep and return to its starting point will be equal to the time occupied by ten cycles of the radio frequency oscillation. Thus if instead of being an exact integral multiple of the pulse recurrence frequency the radio frequency oscillation is one cycle per second higher, the pulse image *p* will travel from left to right and will traverse a distance equal to one tenth of the trace in one second, or it will traverse the whole trace in ten seconds.

Thus by carefully observing the direction of movement of the pulse image and its rate of movement across the screen of the cathode ray tube 13 an operator can accurately compare the frequency of the oscillation applied to the time base circuit 11 with that of the reference tone applied to the generator 10.

It is possible to check the frequency of an oscillation against a reference frequency so chosen that the quotient of the oscillation frequency and a vulgar fraction of the reference frequency is an integer or so near to an integer that the rate of change of phase difference can be observed. In such a case there will be two or more spaced pulse images all moving in unison and at the same rate across the screen. Because of the multiplication of the pulse images and because of the finite number of spots which can be used in practice on a screen of any particular diameter, the case will normally be limited to a small number of pulse images, that is to say, when the vulgar fraction is large.

If a small change in the frequency of the radio frequency oscillation is to be measured accurately, it is advantageous to have a high speed horizontal deflection of the cathode ray.

Conversely, if the radio frequency oscillation is considerably removed from the exact integral multiple value previously mentioned then a slow speed of horizontal deflection is required. Hence the provision of three different frequencies of the stepped saw-tooth oscillation as previously mentioned. In this example, the frequencies of the saw-tooth oscillation have been chosen as 250 kc./s., 100 kc./s., and 50 kc./s. It will be noted that these frequencies are integral multiples of the reference tone and are integral submultiples of the radio frequency oscillation. Integral submultiples of the radio frequency oscillation such as 333⅓ kc./s. or 142$\frac{6}{7}$ kc./s. are not integral multiples of the reference tone and would not be suitable, except in the case where multiple pulse images are used as previously described.

It is clearly possible with the aid of the present invention to check against a standard tone any frequency which is a multiple (not necessarily an integral multiple) of the tone frequency, and which may be integrally divided by a factor equal to the number of steps required on the time base.

In addition to changes in the frequency of the radio frequency oscillation, erratic phase shifts, of the reference tone will also tend to displace the pulse image horizontally. Phase shifts of the reference tone might well take place during its transmission from the master to the slave site.

If an oscillation of linear saw-tooth wave form had been used, and if phase shifts of the reference tone were continuous and rapid the image of the pulse would tend to become confused and it would be difficult to observe accurately the arrival time of the pulse at any particular position. With the time base used in this invention, however, the pulse image moves only over the short time intervals between the calibration spots, caused by the horizontal steps in the wave form of the time base oscillation. Thus provided the time displacement of the phase shift is less than the time for which the cathode ray is stationary on a calibration spot, there will be no apparent movement of the pulse image. If, however, the mean position in time of the pulse corresponds to an interval between two calibration spots the resulting image on the screen of the cathode ray tube 13 will be as shown in Fig. 2 (*e*). A small phase displacement in either direction will cause the pulse to appear as a straight vertical line on the appropriate adjacent calibration spot.

The movement of the pulse may therefore be timed accurately by observing the mean phase of the pulse which is clearly indicated by the inverted U pulse image *p* as in Fig. 2 (*e*).

A greater degree of random phase shift will produce a series of vertical images as shown in Fig. 2 (*f*). However, any progressive displacement of the mean phase can be readily observed by an observation of the displacement of the series of images as a whole.

The frequency of the reference tone in this example has been chosen as 1000 c./s., because of the need to select a tone capable of transmission over a telephone line. Thus the repetition frequency of the pulses derived from this tone is relatively low and the illumination of the pulse image also tends to be low. In the embodiment of Fig. 1, therefore, the pulses are also applied through a condenser 13, an inductance 16, and a potentiometer 17 to the grid of the cathode ray tube 13, as brightening pulses.

A variable D. C. bias voltage is derived from a potentiometer 18 in the cathode circuit of the cathode ray tube 13. This bias is made such that the intensity of the beam has a suitable value in the absence of pulses. Upon the application of the positive pulses to the grid of the cathode ray tube 13 the beam current is increased and causes increased illumination of the image for the duration of each pulse. The bias and the pulse amplitude may be such that the pulse drives the grid to produce saturation current.

In the ideal case, the brightening pulse would have a rectangular wave form as shown by a curve 62 in Fig. 2 (*h*). Thus the illumination would be constant for the duration of the pulse as shown by a curve 63 in Fig. 2 (*g*) where the brightness is indicated by the width of the contour of the image. A pulse of the form shown at 62 in Fig. 2 (*h*) is not readily obtainable and the application of the original pulse shown at 59 in Fig. 2 (*j*) without reshaping would produce an image illumination as shown by the contour width of a pulse indicated by a curve 64 in Fig. 2 (*i*).

To overcome the uneven illumination along the length of the image, a diode 19 is connected across the grid circuit. The function of this valve is to limit the peaks of the pulses and to produce pulses with the form shown by a curve 65 in Fig. 2 (*l*). It is desirable that the diode 19 should be non-conductive until the brightening signal voltage is equal to the maximum permissible grid voltage, so that the signal is limited at this voltage. The cathode of the diode 19 is therefore raised to the required positive potential with respect to its anode, by connecting the cathode to a point 20 in the cathode circuit of the cathode ray tube 13, which point is positive by the required amount with respect to the grid of the tube 13.

The limiting of the pulses is effected by the series circuit consisting of the inductance 16 and the diode 19, the reactance of the inductance 16 being arranged to be much higher than the resistance of the diode 19 when the diode 19 is conductive.

The effect on the brightness of the pulse of using a resistance in place of the inductance 16 is illustrated by the width of a curve 66 shown in Fig. 2 (*k*) in which it will be seen that the maximum brightening of the pulse does not occur until some time after the commencement of the movement of the spot producing the pulse image, and it decreases rapidly to a low value before the spot returns to its starting position. The resulting image as appearing on the calibration spot is illustrated at 67 in Fig. 2 (*m*).

The effect of the inductance 16, however, is to delay the brightening pulse slightly as shown in Fig. 2 (*o*) and the effect on the brightness is illustrated by the contour width of a curve 68 in Fig. 2 (*n*). This shows one side of the pulse image full illuminated along its whole length. The effect of this on the image as viewed on a calibration spot is shown by a line 69 in Fig. 2 (*p*).

The potentiometer 17 is used to set the level of the brightening signal.

Resistors 21 and 22 in conjunction with a resistor 23 are connected across a source of D. C. voltage, the positive terminal of which is connected to the terminal 24 and the negative terminal of which is connected to earth, and are used for the adjustment of horizontal and vertical displacements of the trace on the screen of the cathode ray tube 13.

A potentiometer 25 is provided to control the focus of the cathode ray, and condensers 26, 27 and 28 are decoupling condensers.

The circuit shown in Fig. 3 is a preferred form of locked time base shown in block form at 11 in Fig. 1. Anode current flowing through the valve 29 is used to charge one of three condensers 30, 31 and 32 selected by the arm 33 of a switch 34. The valves 35 and 36 are used to discharge whichever condenser 30, 31 or 32 is in circuit, when the voltage across the condenser 30, 31 or 32 reaches a predetermined value. The values of the condensers 30, 31 and 32 are in this example such that the time base frequency of 250 kc./s. is obtained by using the condenser 30, 100 kc./s. by using the condenser 31, and 50 kc./s. by using the condenser 32. Three condensers 37, 38 and 39 are trimmers for the main fixed condensers 30, 31 and 32 respectively and are used for fine adjustment of each of these time base frequencies.

In order to produce the wave form shown by a curve 60 in Fig. 2 (b), whichever of the condensers 30, 31 or 32 is in circuit must be charged intermittently. Hence a bias on the valve 29, and the amplitude of the applied oscillation of step frequency which amplitude is adjustable by means of a potentiometer 40, are arranged to be such that anode current of the valve 29 is cut off during negative half-cycles, thereby producing the horizontal steps in the saw-tooth wave form. Positive half-cycles, which are arranged to be of sufficient amplitude to cause grid current to flow, are squared-off by grid current flowing through the resistor 40'. Hence the resistance of the valve is substantially constant during each positive half-cycle of grid voltage.

The saw-tooth oscillation is locked to the radio frequency oscillation by the adjustment of a variable cathode resistor 41 which is used to vary the bias on the grid of the valve 29, and it is of course, in series with the condenser 30, 31 or 32.

A preferred form of pulse generator for use at 10 in Fig. 1 is shown in Fig. 4. The reference tone applied to the input terminals A and B is amplified and squared-off by the transformer 42 and the valves 43 and 44, the waveforms shown within circles 45, 46, 47, 48 and 49 illustrate the stages of this process.

Thus an oscillation having the wave form illustrated within the circle 49 is applied to the grid of a valve 50. Anode current of this valve 50 flows through a damped oscillatory circuit constituted by an inductance 51 and its associated circuit elements. In this way there are produced at the anode of the valve 50 alternate positive- and negative-going pulses which occur at the changeovers in the square wave form of the anode current produced by the application to the grid of the valve 50 of the voltage having the wave form shown within the circle 49. The wave form of the voltage appearing at the anode of the valve 50 and at the junction of a condenser 52 and resistor 53 are illustrated within circles 54 and 55 respectively.

A valve 55 serves to limit the amplitude of these pulses and the wave form of the voltage appearing at the output terminals E and F is, therefore, as indicated within circle 57.

Thus the pulses appearing at the output terminals E and F are generated when the voltage on the grid of the valve 52 is passing through, or near, zero, and phase stability of the pulses relative to the incoming reference tone is achieved despite variations in the amplitude of the latter.

Variation of a resistor 58 in the grid circuit of the first valve 43, causes the phase of the tone applied to the grid of the valve 43 to be changed.

When the frequency discrepancy of the frequencies, or integral multiples or submultiples of the frequencies, being compared is very small and the finest time base setting is in use, this phasing adjustment may be used to set the pulse to form the inverted U already referred to. The frequency of the slave carier is then adjusted until the pulse image shape is maintained for a considerable time, for instance 10 seconds before it begins to collapse and merge into a single line on one side or the other. The accuracy of adjustment would then be of the order of one part in $10^8$.

We claim:

1. Apparatus for comparing the frequencies of a first and a second oscillation comprising a cathode ray tube having first and second deflecting means for deflecting the cathode ray of said tube in a first and a second co-ordinate respectively and a control electrode for controlling the intensity of said cathode ray, a generator of oscillations of saw-tooth waveform, means for applying said first oscillation to said generator to produce an oscillation of stepped saw-tooth waveform, each cycle of said oscillation of stepped saw-tooth waveform having a plurality of equally-spaced periods of constant amplitude joined by periods of progressively changing amplitude, means for applying said oscillation of stepped saw-tooth waveform to said first deflecting means, a pulse generator for generating pulses having durations which are small relatively to their recurrence period, means for controlling the recurrence frequency of the pulses from said pulse generator in accordance with the frequency of said second oscillation and means for applying said pulses to said second deflecting means to deflect the cathode ray in said second co-ordinate and to said control electrode to control the intensity of the cathode ray.

2. Apparatus for comparing the frequencies of first and second oscillations, comprising a cathode ray tube having first and second deflecting means for deflecting the cathode ray of said tube in two co-ordinates respectively, a generator of further oscillations of saw-tooth waveform including a first electron discharge valve having an anode, a cathode and at least one control electrode, a source of anode voltage for said valve, a capacitor, means connecting said capacitor between the anode of said valve and the positive terminal of said source, means connecting the cathode of said valve to the negative terminal of said source, means biasing said control electrode to render said valve normally non-conducting, means to apply said first oscillations to the control electrode of said valve, the amplitude of said first oscillations sufficient to render said valve conducting during only the positive half-cycles of said first oscillations and hence to cause said capacitor to become charged in steps, a second electron discharge valve having at least an anode and a cathode, means connecting the anode of said second valve to the positive terminal of said source, means connecting the anode of said first valve to the cathode of said second valve, means adjusting said second valve to be normally non-conducting and to become conducting only when said capacitor becomes charged to a predetermined voltage, current flow in said second valve discharging said capacitor, whereby the charging and discharging is recurrent and the voltage at the anode of said first valve is in the form of a stepped saw-tooth, means for applying the voltage at the anode of said first valve to said first deflecting means, means for applying said second oscillations to generate pulses having durations which are small compared with their recurrence period and having a frequency fixedly related to the frequency of said second oscillations, and means for applying said pulses to said second deflecting means.

GEOFFREY GEORGE GOURIET.
REGINALD HARRY HAMMANS.

REFERENCES CITED

The following references are of record in the file of this patent:

UNITED STATES PATENTS

| Number | Name | Date |
|---|---|---|
| 2,121,359 | Luck | June 21, 1938 |
| 2,178,074 | Jackel | Oct. 31, 1939 |
| 2,280,524 | Hansen | Apr. 21, 1942 |
| 2,317,202 | Hohlhagen | Apr. 20, 1943 |
| 2,328,985 | Luck | Sept. 7, 1943 |
| 2,405,238 | Seeley | Aug. 6, 1946 |
| 2,422,182 | Bryant | June 17, 1947 |
| 2,465,355 | Cook | Mar. 29, 1949 |